(12) United States Patent
Mouring et al.

(10) Patent No.: US 11,528,254 B2
(45) Date of Patent: Dec. 13, 2022

(54) SYSTEM AND METHOD OF EMULATING A CLOUD COMPUTING ENVIRONMENT

(71) Applicant: Sequoia Holdings, LLC, Reston, VA (US)

(72) Inventors: Stephen Mouring, Sterling, VA (US); T. Richard Stroupe, Jr., Leesburg, VA (US); Adam Rand, Round Hill, VA (US); Mitchell Ly, Warrenton, VA (US); Matthew Rodgers, Fairfax, VA (US); Jacob Tate, Manassas, VA (US); Andrew Anderson, Boiling Springs, SC (US)

(73) Assignee: Sequoia Holdings, LLC, Reston, VA (US)

(*) Notice: Subject to any disclaimer, the term of this patent is extended or adjusted under 35 U.S.C. 154(b) by 245 days.

(21) Appl. No.: 16/899,984

(22) Filed: Jun. 12, 2020

(65) Prior Publication Data

US 2020/0412696 A1 Dec. 31, 2020

Related U.S. Application Data

(60) Provisional application No. 62/866,219, filed on Jun. 25, 2019.

(51) Int. Cl.
*H04L 29/00* (2006.01)
*H04L 9/40* (2022.01)

(52) U.S. Cl.
CPC ...... *H04L 63/0272* (2013.01); *H04L 63/0209* (2013.01); *H04L 63/0281* (2013.01); *H04L 63/20* (2013.01)

(58) Field of Classification Search
CPC ............. H04L 63/0272; H04L 63/0209; H04L 63/0281; H04L 63/20; H04L 63/0227; H04L 67/06; H04L 67/2814; H04L 69/22; H04L 63/1425

See application file for complete search history.

(56) References Cited

U.S. PATENT DOCUMENTS

| 9,860,208 B1* | 1/2018 | Ettema ................ H04L 63/0227 |
| 2012/0281708 A1* | 11/2012 | Chauhan ............... H04L 67/141 370/401 |
| 2015/0052523 A1 | 2/2015 | Raghu |

(Continued)

OTHER PUBLICATIONS

Musthaler, Linda, "NS1's Private DNS enables modern applications, DevOps and more", *Network World*, Jul. 30, 2018, https://www.networkworld.com/article/3293006/nsls-private-dns-enables-modern-applications-devops-and-more.html.

(Continued)

*Primary Examiner* — Ellen Tran
*Assistant Examiner* — Helai Salehi
(74) *Attorney, Agent, or Firm* — DLA Piper LLP (US)

(57) ABSTRACT

A system and a method of emulating a second cloud computing environment on a first cloud computing environment are disclosed herein. The first cloud computing environment includes an innovation platform having a private domain name system. The private domain name system is split between a customer subnet and a private subnet. The customer subnet is limited to communications with only the private subnet. The customer subnet executes an application thereon. The application is targeted for use on the second cloud computing environment.

19 Claims, 4 Drawing Sheets

(56) References Cited

U.S. PATENT DOCUMENTS

2016/0267410 A1     9/2016   Chung-Sheng et al.

OTHER PUBLICATIONS

Bergbom, John, "Attacking the internal network from the public Internet using a browser as a proxy", *Forcepoint*, Mar. 19, 2019, https://www.forcepoint.com/sides/default/files/resources/files/report-attacking-internal-network-en_0.pdf.
Lupascu, Cristi, "HTTP Request Blocker", Google Chrome Web Store, Jul. 1, 2017, https://chrome.google.com/webstore/detail/http-request-blocker/eckpjmeijpoipmldfbckahppeonkoeko?hl=en.
International Search Report and Written Opinion from counterpart PCT International Appln. No. PCT/US2020/037457 dated Aug. 31, 2020.
The International Preliminary Report on Patentability and Written Opinion dated Jan. 6, 2022, of counterpart PCT International Appln. No. PCT/US2020/037457.

\* cited by examiner

SYSTEM AND METHOD OF EMULATING A CLOUD COMPUTING ENVIRONMENT

FIELD OF THE DISCLOSURE

The present disclosure generally relates to an innovation platform for emulation of a secure, non-public, cloud region, and methods of operating the same.

BACKGROUND

Existing techniques or methods for emulating a secure, non-public cloud region are typically difficult for customers. Many customers who attempt to migrate their systems and applications from an unclassified cloud ("low-side") to a government or classified cloud ("high-side") often encounter many difficulties with high-side compatibility. This is because the high-side can block applications from accessing websites on the open Internet, block applications from accessing cloud services that might not be available on the high-side, contain alternate cloud integration methods, and so forth.

SUMMARY

In some embodiments, a method of emulating a second cloud computing environment on a first cloud computing environment is disclosed herein. The first cloud computing environment includes an innovation platform having a private domain name system. The private domain name system is split between a customer subnet and a private subnet. The customer subnet is limited to communications with only the private subnet. The customer subnet executes an application thereon. The application is targeted for use on the second cloud computing environment. A proxy server of the private subnet monitors one or more network communications originating from the customer subnet. The one or more network communications may include at least one hypertext transfer protocol (HTTP) request to a website available on the public Internet. The proxy server of the private subnet may block the HTTP request and log the HTTP request as a first error or traffic metric, upon identifying that the at least one HTTP request is to the website available on the public internet. The endpoint server of the private subnet monitors one or more endpoint requests originating from the customer subnet. The one or more endpoint requests include at least a first endpoint request to a first endpoint associated with the second cloud computing environment and a second endpoint request to a second endpoint request not associated with the second cloud computing environment. The endpoint server of the private subnet blocks the second endpoint request and logs the second endpoint request as a second error upon identifying the second endpoint request. The endpoint server of the private subnet redirects the request to a first endpoint equivalent associated with the first cloud computing environment and logs the first endpoint request upon identifying the first endpoint request.

In another embodiment, a system is disclosed herein. The system includes a plurality of computing devices hosting a first cloud computing environment associated with a first set of security protocols. The first cloud computing environment includes a private domain name system configured to mimic a second cloud computing environment associated with a second set of security protocols. The second set of security protocols blocks requests to websites and services otherwise available on the first cloud computing environment.

In some embodiments, a non-transitory computer readable medium is disclosed herein. The non-transitory computer readable medium has instructions stored thereon, which, when executed by a processor, causes a system to perform operations. The operations include generating a first cloud computing environment configured to emulate a second cloud computing environment. The first cloud computing environment has a private domain name system that includes a customer subnet and a private subnet. The customer subnet executes a client application that is targeted for use on the second cloud computing environment. The operations further include monitoring, by a proxy server of the private subnet, one or more network communications originating from the customer subnet. The one or more network communications include at least one hypertext transfer protocol request to a website available on a public Internet. The operations further include, upon identifying, by the proxy server of the private subnet, that the at least one hypertext transfer protocol request is to the website available on the public internet, blocking the hypertext transfer protocol request and logging the hypertext transfer protocol request as a first error. The operations further include generating, by a management console of the private subnet, a user interface comprising the first error.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrated only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

One or more techniques disclosed herein generally relate to an innovation platform used to assist system development and workload delivery bound for non-public operational cloud regions (e.g., Microsoft Azure Government, Azure SECRET, Azure TOP SECRET, etc.). Such non-public operational cloud regions provide trusted, proven, and reliable US Intelligence Community (IC) and US Government (USG) DevOps region that delivers custom, high-performance services in a single fabric. The innovation platform described herein allows software vendors to test their assets against standards and customizations of the non-public operational cloud regions, without having to depend on third-party applications.

The term "user" as used herein includes, for example, a person or entity that owns a computing device or wireless device; a person or entity that operates or utilizes a computing device; or a person or entity that is otherwise associated with a computing device or wireless device. It is contemplated that the term "user" is not intended to be limiting and may include various examples beyond those described.

Figure 1:
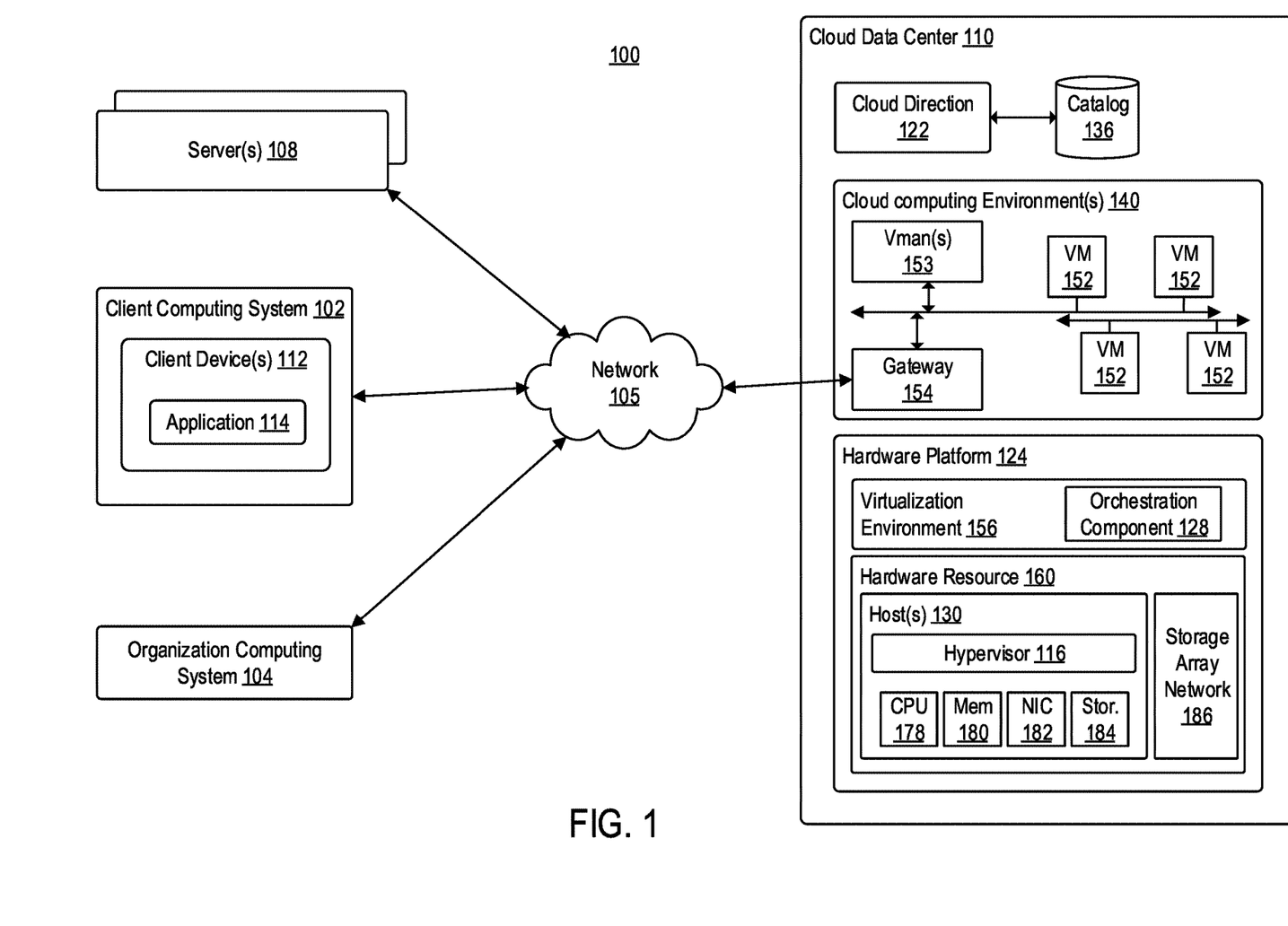
FIG. 1 is a block diagram illustrating a computing environment, according to example embodiments.

FIG. 1 is a block diagram illustrating a computing environment 100, according to example embodiments. Computing environment 100 may include client computing system 102, organization computing system 104, one or more servers 108, and cloud data center 110. Client computing system 102, organization computing system 104, one or more servers 108, and cloud data center 110 may communicate via network 105.

Network 105 may be of any suitable type, including individual connections via the Internet, such as cellular or Wi-Fi networks. In some embodiments, network 105 may connect terminals, services, and mobile devices using direct connections, such as radio frequency identification (RFID), near-field communication (NFC), Bluetooth™, low-energy Bluetooth™ (BLE), Wi-Fi™ ZigBee™, ambient backscatter communication (ABC) protocols, USB, WAN, or LAN. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

Network 105 may include any type of computer networking arrangement used to exchange data or information. For example, network 105 may be the Internet, a private data network, virtual private network using a public network and/or other suitable connection(s) that enables components in computing environment 100 to send and receive information between the components of computing environment 100.

Client computing system 102 may be associated with a client or customer of organization computing system 104. For example, client computing system 102 may represent a software vendor that obtains services from organization computing system 104, such that client computing system 102 may test their assets (e.g., applications) against standards and customization of a second (e.g., private) region of cloud data center 110. Client computing system 102 may include one or more client devices 112. Each client device 112 may belong to or be provided to a user or may be borrowed, rented, or shared. Client device 112 may include at least application 114. Application 114 may be representative of a web browser that allows access to a website or a stand-alone application. Client device 112 may access application 114 to access a cloud computing environment 140 hosted by cloud data center 110.

Organization computing system 104 may be associated with an entity that provides an innovation platform to clients (or customers) to test their asset on a first cloud computing environment, while maintaining the standards and customization of a second cloud computing environment. For example, the first cloud computing environment may include security protocols that are less strict than the security profiles of second cloud computing environment. For example, organization computing system 104 may build their infrastructure on a public cloud computing environment (e.g., cloud computing environment 140), such that the air-gapped cloud architecture of secure, non-public regions (e.g., second cloud computing environment), may be emulated on the first cloud computing environment.

Cloud data center 110 may be operated by a cloud computing service provider and exposed as a service to account holders, such as a particular enterprise. As such, virtual data center 150 may be referred to as a first cloud computing environment (e.g., a "public" cloud region). As mentioned above, exemplary cloud service providers, such as Microsoft® (e.g., Azure®), typically include cloud computing environments that are public (e.g., first cloud computing environment) and private (e.g., second cloud computing environment) cloud computing. Second cloud computing environments may be air-gapped i.e., physically isolating a secure computer network from other unsecured networks (e.g., public Internet).

Cloud data center 110 may be configured to dynamically provide an enterprise (e.g., client computing system 102) with one or more virtual data centers 150 in which a user may provision virtual machines (VMs) 152, deploy multi-tier applications on VMs 120, and/or execute workloads. Cloud data center 110 may include a hardware platform 124 upon which a cloud computing environment 140 may be executed.

As illustrated, hardware platform 124 may include hardware resources 160, storage resources (e.g., one or more storage array systems, such as SAN 164), and networking resources, which may be configured in a manner to provide a virtualization environment 156 that supports the execution of a plurality of VMs 152 across a plurality of hosts (e.g., hosts 130). In some embodiments, hardware resources 160 of virtual data center 150 may be distributed across multiple data centers in different locations.

Hardware resources 160 may include one or more hosts 130. Each host 130 may include one or more processors (CPUs) 178, memory 180, network interface 182, storage 184, and other input/output (I/O) devices, such as, a mouse and keyboard. CPU 180 may be configured to execute instructions, for example, executable instructions that perform one or more operations described herein and may be stored in memory 180 and/or local storage 184. Memory 180 may be representative of a device that allows information, such as executable instructions, virtual disks, configurations, and other data, to be stored and retrieved. Memory 180 may include, for example, one or more random access memory (RAM) modules. Network interface 182 may enable a host 130 to communicate with another device via a communication medium, such as network 105. Network interface 182 may include one or more network adapters, also referred to as a network interface card (NIC). Storage 184 may be representative of local storage devices (e.g., one or more hard disks, flash memory modules, solid state disks, optical disks, etc.) and/or a storage interface that enables host 130 to communicate with one or more network data storage systems.

Each host 130 may be configured to provide a virtualization layer that abstracts processor, memory, storage, and networking resources of hardware platform 124 into multiple VMs 152 that run concurrently on the same hosts. VMs 152 may run on top of a software interface layer, referred to herein as a hypervisor 116, that enables sharing of the hardware resources of host 130 by VMs 152. One example of hypervisor 116 that may be used in an embodiment described herein is Hyper-V® hypervisor provided as part of Microsoft® Azure® cloud computing service. In some embodiments, hypervisor 116 may execute on top of the operating system of a given host 130. In some embodiments, hypervisor 116 may execute directly on hardware components of host 130.

Each cloud computing environment 140 may be associated with a particular tenant of cloud data center 110, such as an enterprise associated with client computing system 102. In some embodiments, cloud computing environment 140 may be configured as a dedicated cloud service for a single tenant comprised of dedicated hardware resource (i.e., physically isolated from hardware resources accessed by other users of cloud data center 110). In some embodiments, cloud data center 110 may be configured as part of a multi-tenant cloud service with logically isolated virtualized computing resources on a shared physical infrastructure. As shown, cloud data center 110 may support multiple cloud computing environments 140.

In some embodiments, virtualization environment 156 may include an orchestration component 128. Orchestration component 128 may provide infrastructure resources to cloud computing environment 140 responsive to provisioning requests. For example, if an enterprise required a specific number of virtual machines to deploy a web application or to modify a currently running web application to support peak demands, orchestration component 158 may initiate and manage the instantiation of VMs 152 on hosts 130 to support such request.

In some embodiments, cloud data center 110 may include a cloud director 122. In some embodiments, cloud director 122 may execute across one or more virtual machines). Cloud director 122 may be configured to manage allocation of virtual computing resources to an enterprise for deploying applications. Cloud director 122 may be accessible to users via a representational stat transfer (REST) application programming interface (API) or any other client-server communication protocol. Cloud director 122 may authenticate connection attempts from the enterprise using credentials issued by the cloud computing provider. Cloud director 122 may maintain and publish a catalog 136 of available virtual machine templates and packaged virtual machine applications that represent virtual machines that may be provisioned in cloud computing environment 140. A virtual machine template may be a virtual machine image that is loaded with a pre-installed guest operating system, applications, and data, and is typically used to repeatedly create a virtual machine having the pre-defined configuration. A packaged virtual machine application may be a logical container of pre-configured virtual machines having software components and parameters that define operational details of the packaged application. Cloud director 122 may receive provisioning requests submitted (e.g., via REST API calls) and may propagate such requests to orchestration component 128 to instantiate the requested virtual machines (e.g., VMs 152).

In some embodiments, cloud computing environment 140 may support the creation of a virtual data center 150 having a plurality of virtual machines 152 instantiated to, for example, host deployed multi-tier applications, as well as one or more virtualization managers 153 (abbreviated as "Vman(s)"). A virtual data center 150 may be a logical construct that provides compute, network, and storage resources to an organization. Virtual data centers 150 may provide an environment where VM 152 can be created, stored, and operated, enabling complete abstraction between the consumption of infrastructure service and underlying resources.

Virtual data center 150 may include one or more virtual networks 142 used to communicate between VMs 152 and managed by at least one networking gateway component (e.g., gateway 154), as well as one or more isolated internal networks 146 not connected to gateway 154. Gateway 154 (e.g., executing as a virtual appliance) may be configured to provide VMs 152 and other components in cloud computing environment 140 with connectivity to external network 105 (e.g., Internet). Gateway 154 may manage external public IP addresses for virtual data center 150 and one or more private internal networks interconnecting VMs 152. Gateway 154 may be configured to route traffic incoming to and outgoing from virtual data center 150 and provide networking services.

Figure 2:
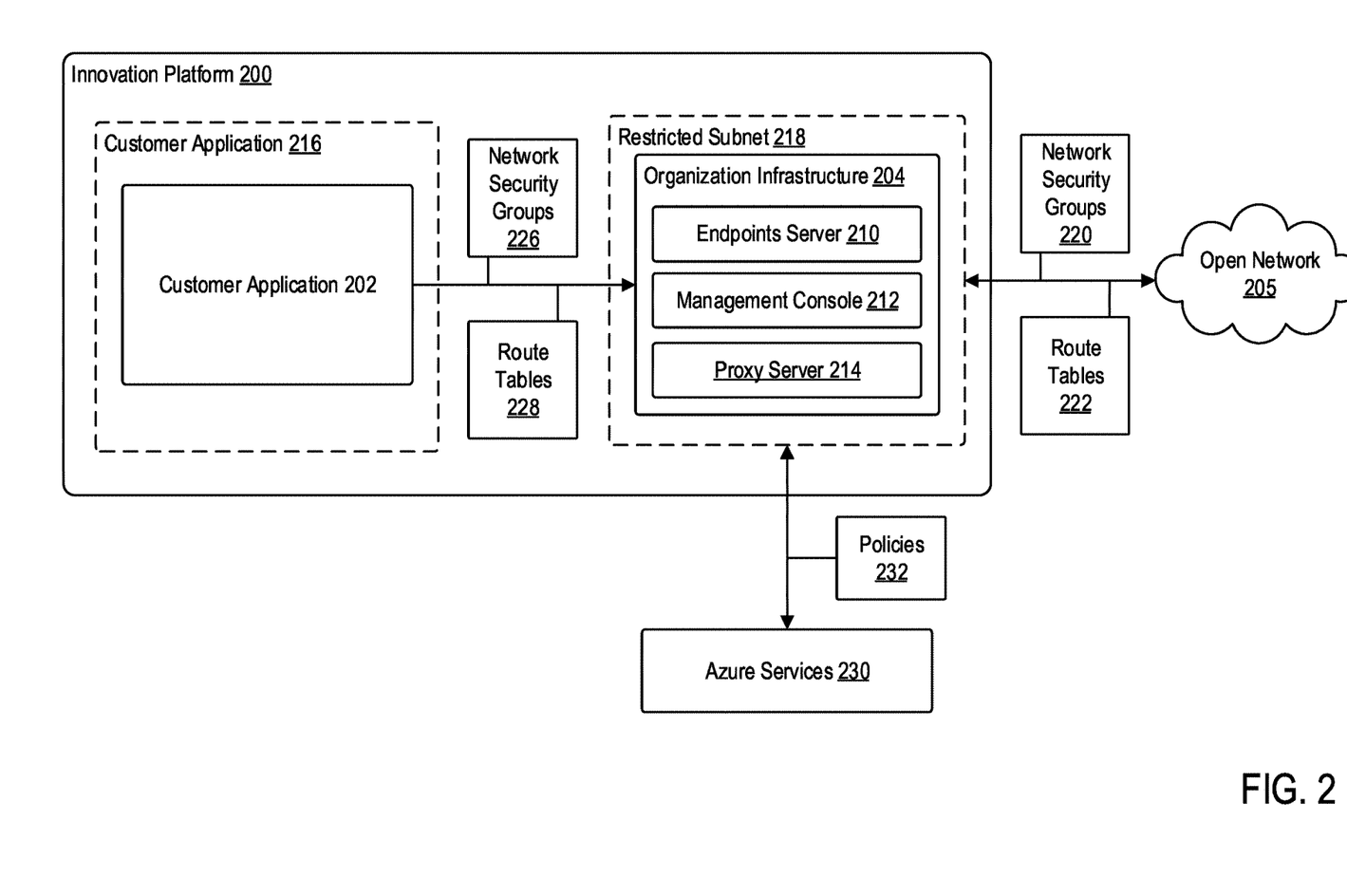
FIG. 2 is a block diagram illustrating an innovation platform, according to example embodiments.

FIG. 2 is a block diagram illustrating an innovation platform 200, according to example embodiments. Innovation platform 200 may be associated with organization computing system 104. For example, organization computing system 104 may build innovation platform 200 in a cloud computing environment 140 provided by cloud data center 110. Innovation platform 200 may be made accessible to client computing system 102. In this way, client computing system 102 may test their assets against standards and customizations typically associated with a second cloud computing environment, while actually working in a first cloud computing environment.

As illustrated, innovation platform 200 may be representative of a virtual network that has its own private domain name system (DNS) server. The DNS may be split between a customer subnet 216 dedicated to client computing system 102 and a restricted subnet 218 dedicated to organization computing system 104. Via customer subnet 216, client computing system 102 may migrate their asset or application (e.g., customer application 202) for execution in the cloud computing environment. For example, client computing system 102 may execute customer application 202 across one or more virtual machines instantiated via customer subnet 216.

Generally, customer subnet 216 may be monitored or restricted from transmitting outbound connections to the Internet. Such functionality aids in mimicking the air-gapped or security compliance environment of the second cloud. To restrict customer subnet 216 from outbound communications, innovation platform 200 may utilize a combination of network security groups 226 and route tables 228.

Route tables 228 may be configured to specify all routes that a given server in customer subnet can make. For example, innovation platform 200 may include a route table that specifies that customer subnet can only make connections to restricted subnet 218. Accordingly, all outbound traffic originating from customer subnet 216 may be restricted to restricted subnet 218. For example, if a customer attempted to reach out to a server 108 via open network 205, the virtual machine submitting the request may see in route table 228 that the request first needs to go to the address of the private subnet before reaching open network 205.

Network security groups 226 may define or limit the type of traffic sent from a virtual machine executing customer application 202 via customer subnet 216. By only allowing a certain type of traffic from customer subnet 216, network security groups may aid innovation platform 200 in mimicking configuration settings of second cloud computing environments.

Organization infrastructure 204 may be deployed in innovation platform 200 via restricted subnet 218. Organization infrastructure 204 may represent one or more components used to fully emulate an air-gapped architecture of a secure, second cloud computing environment on a first cloud computing environment. Organization infrastructure 204 may aid in providing an environment that resembles the secure, second cloud computing environment, thereby allowing customers (e.g., client computing system 102) to test and develop an application thereon.

Organization infrastructure 204 may include endpoint server 210, management console 212, and proxy server 214. Each of endpoint server 210, management server 212, and proxy server 214 may reside in one or more virtual machines. In some embodiments, each virtual machine may execute Linux operating systems.

Endpoint server 210 may be configured to monitor traffic from customer subnet 216. For example, endpoint server 210 may execute one or more algorithms to identify endpoint requests in traffic originating from customer subnet 216. Typically, in the second cloud computing environment, there may be various endpoints and/or fingerprints for accessing certain services. For example, the cloud data center 110 services available to users in a first cloud computing environment may not be available in the second cloud computing environment. Similarly, the services in the second cloud computing environment may differ in functionality from the services in the first cloud computing environment.

Using a specific example, endpoint server 210 may be configured to determine whether customer subnet 216 attempted to access a second cloud computing endpoint or a first cloud computing, commercial endpoint. If, for example, endpoint server 210 determines that customer subnet 216 attempted to access a second cloud computing endpoint (e.g., private Azure® service), endpoint server 210 may log the attempt and redirect traffic back to a public, first cloud computing environment endpoint equivalent. In this manner, customer application 202 may continue to execute normally. If on the other hand, for example, endpoint server 210 determines that customer subnet 216 attempted to access a first cloud computing environment, commercial endpoint, then endpoint server 210 may log the request as an error. In this manner, endpoint server 210 aids in ensuring that innovation platform 200 mimics the second cloud environment.

Proxy server 214 may be configured to monitor network traffic originating from customer subnet 216. For example, proxy server 214 may be configured to execute one or more algorithms to identify any hypertext transfer protocol (HTTP) or other network requests originating from customer subnet 216. As described previously, typically, in the second cloud computing environment, applications are not able to access open network 205. For example, if, during execution, customer application 202 attempts to transmit an HTTP request to Google.com, proxy server 214 may intercept the request, block the request, and log the request as a violation. In other words, proxy server 214 is configured to monitor execution of customer application 202 to ensure that customer application 202 does not rely on open Internet sources.

Management console 212 may be configured to execute a web application that maintains a list of migration and/or service violations. For example, management console 212 may be configured to execute a web application that maintains a list of endpoint violations and/or network violations during execution of customer application 202. In some embodiments, management console 212 may be configured to maintain a database of all violations that occur during execution of customer application 202. Accordingly, after or during execution of customer application 202, management console 212 may pull violation errors from the database and display the violation errors to client computing system 102 via a user interface. In addition to the violation errors, in some embodiments, management console 212 may be configured to provide insights or recommendations to overcome the violations. Continuing with the above example, management console 212 may advise client computing system 102 to not use Google.com because Google.com will not be accessible on the second cloud environment. Continuing with another example, management console 212 may advise client computing system 102 to no longer invoke a given cloud data center 110 service because that service is not available to users on the second cloud environment.

In some embodiments, management console 212 of the private subnet may generate a user interface that provides the following capabilities: (1) Tracking errors in the customer workload, attributable to specific servers and agents, that correspond to either inconsistencies between commercial cloud and secure cloud, or deviations from suggested best practices; (2) Providing remediation guidance tailored to the specific issue details; (3) Providing recommendations in line with best practices; (4) Reporting on the impacts of specific or custom settings in the specific account; (5) Displaying metrics and statistics related to the migration characteristics of the customer workload, including summaries, insights, and rollups thereof; and (6) Providing self-service functionality to execute service requests on the environment, including but not limited to, managing user accounts, managing network settings, managing target secure cloud, etc.

As further illustrated by FIG. 2, restricted subnet 218 may be able to communicate with open network 205. For example, network security groups 220 and route tables 222 may be defined, such that there may be two-way communication between restricted subnet 218 and open network 205.

Further, restricted subnet 218 may be configured to communicate with cloud data center services 230. Cloud data center services 230 may be representative of services that are available to customers on the second cloud environment. For example, policies 232 may define those services that are available to users in second cloud environment. Exemplary services may include, but are not limited to: Compute, Networking, Databases, Containers, and Storage.

Figure 3:
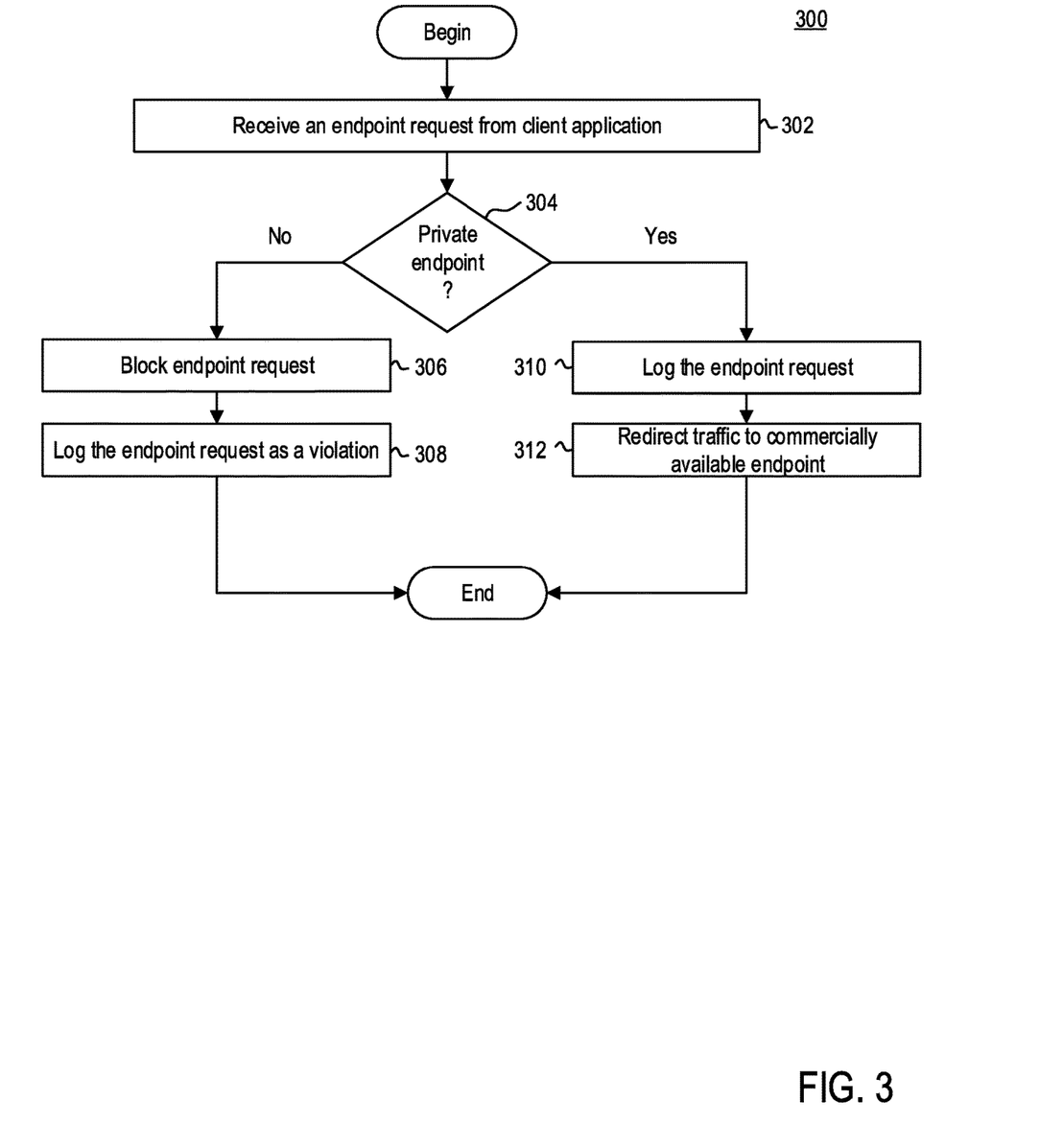
FIG. 3 is a flow diagram illustrating a method of emulating a second cloud computing environment on a first cloud computing environment, according to example embodiments.

FIG. 3 is a flow diagram illustrating a method 300 of emulating a second cloud environment on a first cloud environment, according to example embodiments. Method 300 may begin at step 302.

At step 302, restricted subnet 218 may receive an endpoint request from customer application 202. For example, during execution of customer application 202, restricted subnet 218 may receive an endpoint request from customer subnet 216. The endpoint request may, for example, specify a cloud data center service 230 customer application 202 would like to access during execution.

At step 304, endpoint server 210 may determine whether the customer subnet attempted to access a second cloud computing endpoint of a first cloud computing is a commercial endpoint. For example, endpoint server 210 may parse the service request to determine the endpoint called by customer application 202. Endpoint server 210 may compare the requested endpoint to a list of cloud data center endpoints that may be available to the user on the second cloud computing environment.

If, at step 304, endpoint server 210 determines that the endpoint called by customer application 202 is an endpoint that is not available on the second cloud computing environment, then at step 306, endpoint server 210 may block the endpoint request. In some embodiments, at step 308, endpoint server 210 may log the endpoint request as a violation.

If, however, at step 304, endpoint server 210 determines that the endpoint called by customer application 202 is an endpoint that is available on the second cloud computing environment, then at step 310, endpoint server 210 may log the request. At step 312, endpoint server 210 may redirect traffic back to a first cloud computing environment, commercially available endpoint equivalent.

Figure 4:
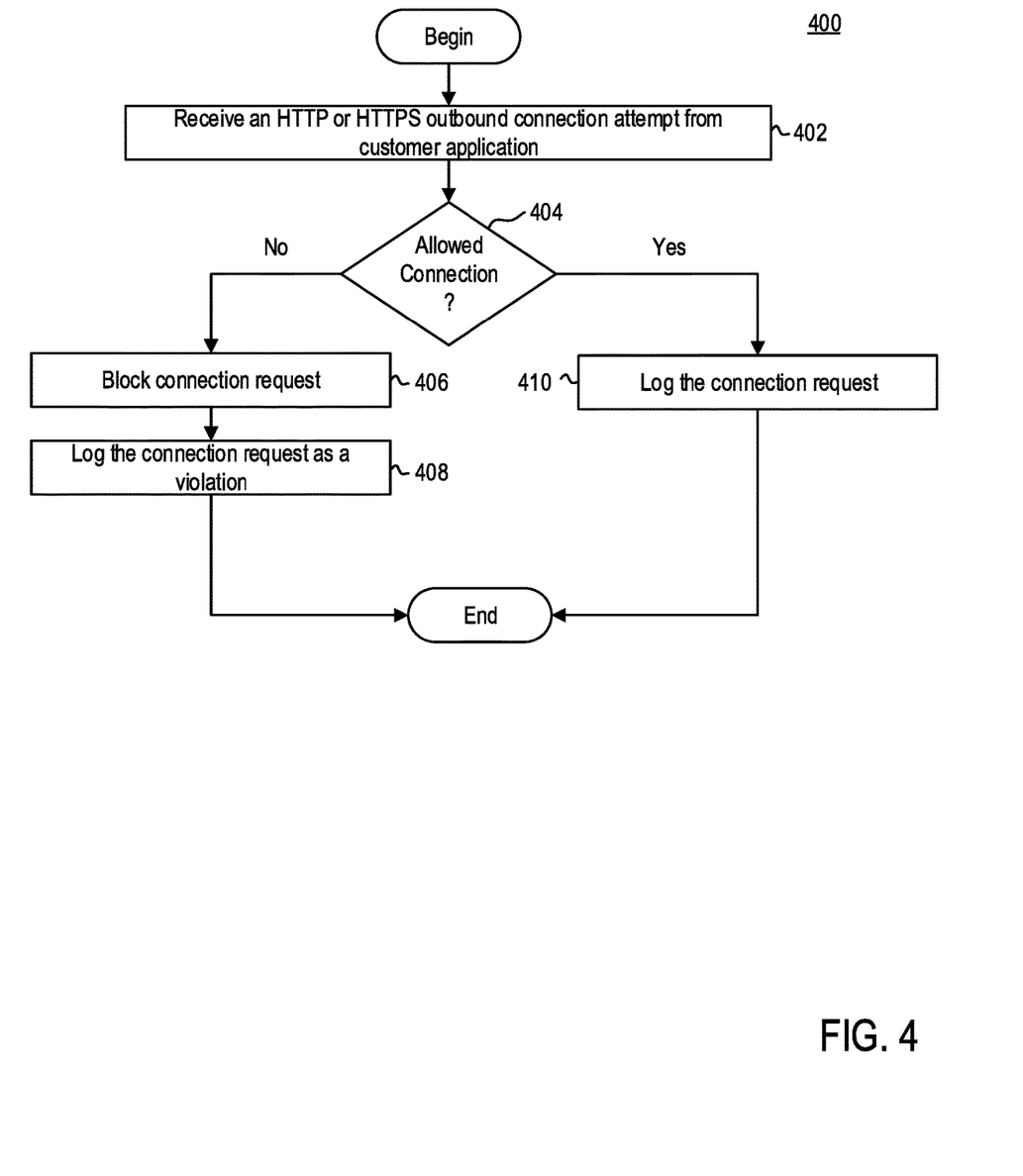
FIG. 4 is a flow diagram illustrating a method of emulating a second cloud computing environment on a first cloud computing environment, according to example embodiments.

FIG. 4 is a flow diagram illustrating a method 400 of emulating a second cloud environment on a first cloud environment, according to example embodiments. Method 400 may begin at step 402.

At step 402, restricted subnet 218 may receive an HTTP or HTTPS outbound connection attempt from customer application 202. For example, during execution of customer application 202, restricted subnet 218 may receive an HTTP or HTTPS request from customer subnet 216. The HTTP request may specify a website to which customer application is attempting to access.

At step 404, proxy server 214 may determine whether the customer subnet attempted to access an allowed connection on the open network. For example, proxy server 214 may parse the HTTP to determine the website called in the HTTP or HTTPS request.

If, at step 404, proxy server 214 determines that the website requested by customer application 202 is a commercially available website on the open network, then at step 406, proxy server 214 may block the HTTP or HTTPS request. In some embodiments, at step 408, proxy server 214 may log the service request as a violation or a traffic metric.

If, however, at step 408, proxy server 214 determines that the website called by customer application 202 is a private website available on the second cloud computing environment, then at step 406, proxy server 214 may log the request. After the HTTP request is logged, proxy server 214 may store the HTTP request in the database of management console 212 for display on the user interface.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

What is claimed:

1. A method of emulating a second cloud computing environment on a first cloud computing environment, wherein the first cloud computing environment has a first security level and the second cloud computing environment has a second security level, the first cloud computing environment comprising an innovation platform having a private domain name system split between a customer subnet and a private subnet, wherein the customer subnet is limited to communications with only the private subnet, the customer subnet executing an application thereon, wherein the application is targeted for use on the second cloud computing environment, the method comprises:

monitoring, by a proxy server of the private subnet, one or more network communications originating from the customer subnet, wherein the one or more network communications comprise at least one hypertext transfer protocol request to a website available on a public Internet;

upon identifying, by the proxy server of the private subnet, that the at least one hypertext transfer protocol request is to the website available on the public internet, blocking the at least one hypertext transfer protocol request and logging the at least one hypertext transfer protocol request as a first error;

monitoring, by an endpoint server of the private subnet, one or more endpoint requests originating from the customer subnet, wherein the one or more endpoint requests comprise at least a first endpoint request to a first endpoint associated with the second cloud computing environment and a second endpoint request to a second endpoint not associated with the second cloud computing environment;

emulating, by the endpoint server of the private subnet, functionality of the second cloud computing environment in the first cloud computing environment, the emulating comprising:

upon identifying, by the endpoint server of the private subnet, the second endpoint request, blocking the second endpoint request and logging the second endpoint request as a second error, and upon identifying, by the endpoint server of the private subnet, the first endpoint request, redirecting the first endpoint request to a first endpoint equivalent associated with the first cloud computing environment and logging the first endpoint request; and generating, by a management console of the private subnet, a user interface comprising the first error.

2. The method of claim 1, further comprising:

parsing, by the proxy server of the private subnet, the at least one hypertext transfer protocol request to determine whether the website is available on the public internet.

3. The method of claim 1, further comprising:

parsing, by the proxy server of the private subnet, the second endpoint request to determine whether each of the first endpoint request and the second endpoint request are associated with the second cloud computing environment.

4. The method of claim 1, wherein monitoring, by the proxy server of the private subnet, the one or more network communications originating from the customer subnet comprises:

intercepting the at least one hypertext transfer protocol request originating from the customer subnet.

5. The method of claim 1, further comprising:
maintaining, by the management console of the private subnet, a list of endpoint violations.

6. The method of claim 1, further comprising:
maintaining, by the management console of the private subnet, a list of network violations.

7. The method of claim 1, further comprising:
generating, by the management console of the private subnet, one or more recommendations to overcome an endpoint violation or a network violation.

8. A system, comprising:
a plurality of computing devices hosting a first cloud computing environment associated with a first set of security protocols of a first security level, wherein the first cloud computing environment comprises a private domain name system configured to mimic a second cloud computing environment associated with a second set of security protocols of a second security level, the second set of security protocols blocking requests to websites and services otherwise available on the first cloud computing environment, the private domain name system comprising a customer subnet and a restricted subnet, wherein the customer subnet is limited to communications with only the restricted subnet, the customer subnet executing an application thereon, wherein the application is targeted for use on the second cloud computing environment, the plurality of computing devices configured to perform operations comprising:
monitoring, by a proxy server of the restricted subnet, one or more network communications originating from the customer subnet, wherein the one or more network communications comprise at least one hypertext transfer protocol request to a website available on a public Internet;
upon identifying, by the proxy server of the restricted subnet, that the at least one hypertext transfer protocol request is to the website available on the public internet, blocking the at least one hypertext transfer protocol request and logging the at least one hypertext transfer protocol request as a first error;
monitoring, by an endpoint server of the restricted subnet, one or more endpoint requests originating from the customer subnet, wherein the one or more endpoint requests comprise at least a first endpoint request to a first endpoint associated with the second cloud computing environment and a second endpoint request to a second endpoint not associated with the second cloud computing environment;
emulating, by the endpoint server of the restricted subnet, functionality of the second cloud computing environment in the first cloud computing environment, the emulating comprising:
upon identifying, by the endpoint server of the restricted subnet, the second endpoint request, blocking the second endpoint request and logging the second endpoint request as a second error, and
upon identifying, by the endpoint server of the restricted subnet, the first endpoint request, redirecting the first endpoint request to a first endpoint equivalent associated with the first cloud computing environment and logging the first endpoint request; and
generating, by a management console of the restricted subnet, a user interface comprising the first error.

9. The system of claim 8, wherein the system mimics an air-gap between the customer subnet and the restricted subnet.

10. The system of claim 8, wherein the restricted subnet comprises the management console, the management console configured to execute a web application that maintains a list of migration violations and service violations.

11. The system of claim 8, wherein the operations further comprise:
parsing, by the proxy server of the restricted subnet, the at least one hypertext transfer protocol request to determine whether the website is available on the public internet.

12. The system of claim 8, wherein the operations further comprise:
parsing, by the proxy server of the restricted subnet, the second endpoint request to determine whether each of the first endpoint request and the second endpoint request are associated with the second cloud computing environment.

13. The system of claim 8, wherein monitoring, by the proxy server of the restricted subnet, the one or more network communications originating from the customer subnet comprises:
intercepting the at least one hypertext transfer protocol request originating from the customer subnet.

14. The system of claim 8, wherein the operations further comprise:
maintaining, by the management console of the restricted subnet, a list of endpoint violations.

15. The system of claim 8, wherein the operations further comprise:
maintaining, by the management console of the restricted subnet, a list of network violations.

16. The system of claim 8, wherein the operations further comprise:
generating, by the management console of the restricted subnet, one or more recommendations to overcome an endpoint violation or a network violation.

17. The system of claim 10, wherein the management console is configured to maintain a list of endpoint violations and service violations during execution of a customer application on the customer subnet.

18. A non-transitory computer readable medium having instructions stored thereon, which, when executed by a processor, causes a system to perform operations comprising:
generating a first cloud computing environment configured to emulate a second cloud computing environment, wherein the first cloud computing environment has a first security level and the second cloud computing environment has a second security level, the first cloud computing environment having a private domain name system comprising a customer subnet and a private subnet, wherein the customer subnet executes a client application that is targeted for use on the second cloud computing environment;
monitoring, by a proxy server of the private subnet, one or more network communications originating from the customer subnet, wherein the one or more network communications comprise at least one hypertext transfer protocol request to a website available on a public Internet;
emulating, by the proxy server of the private subnet, functionality of the second cloud computing environment in the first cloud computing environment, the emulating comprising:

upon identifying, by the proxy server of the private subnet, that the at least one hypertext transfer protocol request is to the website available on the public internet, blocking the at least one hypertext transfer protocol request and logging the at least one hypertext transfer protocol request as a first error; and generating, by a management console of the private subnet, a user interface comprising the first error.

19. The non-transitory computer readable medium of claim 18, further comprising:

monitoring, by an endpoint server of the private subnet, one or more endpoint requests originating from the customer subnet, wherein the one or more endpoint requests comprise at least a first endpoint request to a first endpoint associated with the second cloud computing environment and a second endpoint request to a second endpoint not associated with the second cloud computing environment;

upon identifying, by the endpoint server of the private subnet, the second endpoint request, blocking the second endpoint request and logging the second endpoint request as a second error;

upon identifying, by the endpoint server of the private subnet, the first endpoint request, redirecting the first endpoint request to a first endpoint equivalent associated with the first cloud computing environment and logging the first endpoint request; and updating, by the management console of the private subnet, the user interface to include the second error.

* * * * *

UNITED STATES PATENT AND TRADEMARK OFFICE
CERTIFICATE OF CORRECTION

| | | |
|---|---|---|
| PATENT NO. | : 11,528,254 B2 | Page 1 of 1 |
| APPLICATION NO. | : 16/899984 | |
| DATED | : December 13, 2022 | |
| INVENTOR(S) | : Mouring et al. | |

It is certified that error appears in the above-identified patent and that said Letters Patent is hereby corrected as shown below:

On the Title Page

At item (73) Assignee, please correct "IIoldings" to --Holdings--.

Signed and Sealed this
Twenty-seventh Day of August, 2024

Katherine Kelly Vidal
*Director of the United States Patent and Trademark Office*